Figure 1:
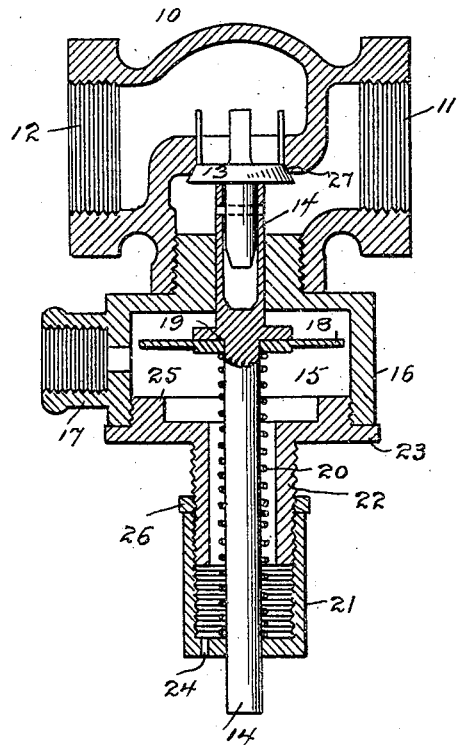

No. 838,692. PATENTED DEC. 18, 1906.
A. W. DATER.
AUTOMATIC FUEL VALVE.
APPLICATION FILED DEC. 20, 1905.

WITNESSES
H. A. Lamb
Edith L. Grant

INVENTOR
Alfred W. Dater
BY
A. M. Wooster
ATTORNEY

UNITED STATES PATENT OFFICE.

ALFRED W. DATER, OF STAMFORD, CONNECTICUT.

AUTOMATIC FUEL-VALVE.

No. 838,692.   Specification of Letters Patent.   Patented Dec. 18, 1906.

Application filed December 20, 1905. Serial No. 292,584.

*To all whom it may concern:*

Be it known that I, ALFRED W. DATER, a citizen of the United States, residing at Stamford, county of Fairfield, State of Connecticut, have invented a new and useful Automatic Fuel-Valve, of which the following is a specification.

This invention has for its object to provide a simple and inexpensive automatic valve especially adapted for use in connection with a hydrocarbon-fuel supply, as gas or oil, to shut off the fuel-supply should the air-pressure drop below a certain minimum or normal pressure and which may be regulated by the operator.

It is of course necessary in using hydrocarbon-fuel for any purpose whatever, as in ovens or furnaces, that the air-supply should not fall below a certain operative pressure. This air-supply is usually furnished from a blower and is liable to occasional interruptions. Should this happen from any cause whatever, as the running off of a blower-belt, and the fuel-supply remain unchecked, the combustion of the fuel would necessarily be imperfect and serious results might follow from an explosion of gas or from flooding of oil.

The present invention wholly obviates this danger and provides an extremely sensitive automatic cut-off for the fuel which may be adjusted to any air-pressure and will instantly operate should the air-pressure drop to an appreciable extent.

With this and other objects in view I have devised the novel automatic valve of which the following description, in connection with the accompanying drawings, is a specification, reference characters being used to indicate the several parts.

Figure 2:
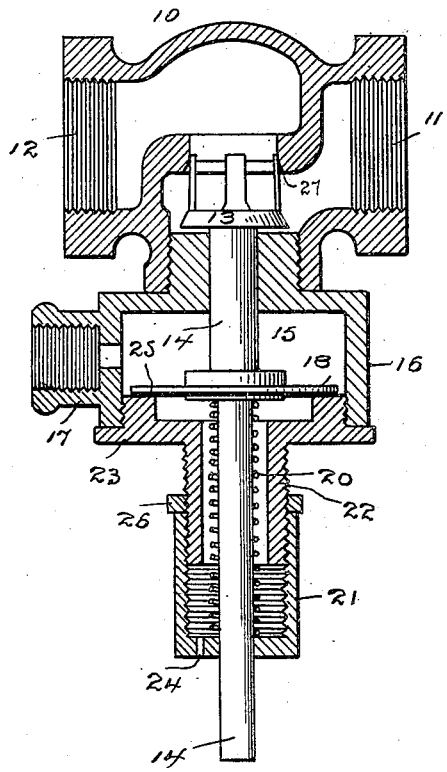

Figure 1 is a vertical section of my novel valve complete, the valve-disk being in the closed or shutting-off position; and Fig. 2 is a similar view showing the valve in the open or operative position.

10 denotes the body of the valve, which is provided with an internally-threaded hub 11 for the attachment of a fuel-supply pipe and with a hub 12 for the attachment of a fuel-delivery pipe.

13 denotes the valve-disk, which is adapted to engage a seat 27 to shut off the fuel-supply, as in Fig. 1. This disk is carried by a stem 14, which extends downward through and below an air-chamber 15. The body of the air-chamber, which is indicated by 16, is rigidly secured to the body of the valve and is provided with an internally-threaded hub 17 for the attachment of an air-supply pipe, neither the air-supply pipe, fuel-supply pipe, or fuel-delivery pipe being shown. Within the air-chamber is a disk 18, shown as carried loosely by the stem and supported against a shoulder 19 on the stem by a coil-spring 20, surrounding the stem and bearing against the disk and against the inner face of a cap 21, which is threaded to engage a hub 22, extending downward from the air-chamber and within which the stem and spring lie loosely. This hub is shown as made integral with a cap 23, which is threaded to engage the body of the air-chamber and comprises one side thereof. It should be understood, however, that the special details of construction are wholly unimportant so far as the principle of the invention is concerned.

24 denotes an air-hole in the cap which permits escape of air from the air-chamber when the valve is closed.

The inner face of cap 23 is provided with a seat 25, which is adapted to be engaged by disk 18 to prevent escape of air from the air-chamber when the valve is wide open, as in Fig. 2. At other times the pressure of the air in chamber 15 has no effect upon the disk 18, because said disk is so constructed (as by being of less diameter than the interior of the chamber, as shown in the drawings) that air is permitted to pass freely to either side of the disk the moment that the disk leaves the seat 25.

The tension of the spring may be adjusted to meet the requirements of use—that is, to correspond with the air-pressure by turning cap 21 up or down on hub 22.

26 denotes a check-nut by which the cap is locked in place after adjustment.

The operation, which will be clearly understood from the drawings, is as follows: The normal position of the parts is as in Fig. 1, in which disk 18 is shown as raised above seat 25, and valve-disk 13 is shown in engagement with seat 27, thereby shutting off the fuel-supply, air entering the air-chamber passing out through air-hole 24. In starting the operator draws down the stem, unseating the valve-disk and seating disk 18 upon seat 25 in the air-chamber. This permits the fuel to pass through the valve freely and shuts off the escape of air from the air-chamber, as clearly shown in Fig. 2, the air-pressure in the air-chamber retaining disk 18 upon its seat. This position of the parts will be maintained so long as the air-pressure remains normal—that is, greater than the power of the spring. Should the air-pressure fall appreciably below normal, however, from any cause whatever, as the running off of a blower-belt, the disk will be unseated by the spring, which will allow air in the air-chamber to pass out at air-hole 24, and valve-disk 13 will be forced by the spring into engagement with seat 27, thereby shutting off the fuel-supply instantly and rendering it impossible for an explosion to occur or any damage to result from flooding with oil, should oil be used as a fuel. As the disk permits air to pass except when seated on the seat 25, there can be no confined body of air, or air-cushion, or to obstruct the instant closing of the fuel-valve the moment that the air-pressure becomes less than the pressure of the spring 20.

Having thus described my invention, I claim—

1. An automatic fuel-valve comprising a valve and seat, an air-chamber, a stem carrying the valve and extending through the air-chamber, a disk carried by said stem and a spring bearing against the disk and acting to close the valve, normal air-pressure acting to retain the valve in the open position against the power of the spring, a passage-way for air being formed to permit air to pass the disk when raised from its seat.

2. An automatic fuel-valve comprising a valve and seat, an air-chamber below the valve also having a seat, a stem by which the valve is carried, a disk loosely engaging said stem and adapted to engage the seat in the chamber, a spring engaging the disk and acting to retain the disk unseated and the valve seated and means for adjusting the tension of the spring, a passage-way for air being formed to permit air to pass the disk when raised from its seat.

In testimony whereof I affix my signature in presence of two witnesses.

ALFRED W. DATER.

Witnesses:
A. M. WOOSTER,
S. W. ATHERTON.